United States Patent
Ben Natan et al.

(10) Patent No.: US 9,781,386 B2
(45) Date of Patent: Oct. 3, 2017

(54) VIRTUAL MULTIPOINT CONTROL UNIT FOR UNIFIED COMMUNICATIONS

(71) Applicant: ClearOne Communications Hong Kong Ltd., Hong Kong (HK)

(72) Inventors: Avishay Ben Natan, Hod Hasharon (IL); Derek L. Graham, South Jordan, UT (US)

(73) Assignee: ClearOne Communications Hong Kong Ltd., Hong Kong (HK)

( * ) Notice: Subject to any disclaimer, the term of this patent is extended or adjusted under 35 U.S.C. 154(b) by 0 days.

(21) Appl. No.: 15/062,066

(22) Filed: Mar. 5, 2016

(65) Prior Publication Data

US 2016/0373696 A1     Dec. 22, 2016

Related U.S. Application Data

(63) Continuation of application No. 14/341,818, filed on Jul. 27, 2014, now abandoned.
(Continued)

(51) Int. Cl.
    *H04N 7/15*     (2006.01)
    *G10L 19/16*     (2013.01)
    *H04N 7/14*     (2006.01)

(52) U.S. Cl.
    CPC ........... *H04N 7/152* (2013.01); *G10L 19/173* (2013.01); *H04N 7/147* (2013.01)

(58) Field of Classification Search
    CPC ...................................... H04N 7/152
    USPC .... 348/14.03, 14.08, 14.09, 14.12; 370/352; 379/88.14; 455/456.1; 700/94; 709/204, 709/206, 229, 231; 715/736, 773; 726/9
    See application file for complete search history.

(56) References Cited

U.S. PATENT DOCUMENTS 6,075,571 A    6/2000   Kuthyar et al.
7,113,992 B1    9/2006   Even
(Continued)

FOREIGN PATENT DOCUMENTS

DE     10358846 A1    7/2005
EP     0955765 A1    11/1999
(Continued)

OTHER PUBLICATIONS

Virtual Audio Cable, "Latest version: 4.15 new Description" available online at <http://software.muzychenko.net/eng/vac.htm>, 9 pages, document downloaded Mar. 21, 2016.

*Primary Examiner* — Gerald Gauthier
(74) *Attorney, Agent, or Firm* — Matthew J. Booth PLLC; Matthew J. Booth (57) ABSTRACT

This disclosure describes a virtual multipoint control unit in communication with one or more unified communication (UC) applications on one or more host devices over a network that allows ad hoc UC conferences between UC applications from different vendors. The virtual multipoint control unit includes a host device coupled to a network. In addition, the unit includes one or more unified communication (UC) applications being executed in software instructions. The virtual multipoint control unit virtualizes the physical audio devices to be shared simultaneously between multiple UC applications and allows ad hoc UC conferences between said UC applications from the same and or different UC vendors.

20 Claims, 6 Drawing Sheets

Related U.S. Application Data (60) Provisional application No. 61/859,358, filed on Jul. 29, 2013.

(56)  References Cited

U.S. PATENT DOCUMENTS

| | | | |
|---|---|---|---|
| 7,701,926 B2 | 4/2010 | Gavish et al. | |
| 8,035,679 B2 | 10/2011 | Eisenberg et al. | |
| 8,200,758 B2 | 6/2012 | Serr et al. | |
| 8,428,228 B1* | 4/2013 | Baxter, Jr. | G06Q 10/10 379/142.14 |
| 8,446,451 B2 | 5/2013 | Eshkoli et al. | |
| 8,456,510 B2* | 6/2013 | King | H04N 7/152 348/14.08 |
| 8,671,149 B1 | 3/2014 | Baxter, Jr. | H04L 51/04 709/206 |
| 8,692,864 B2 | 4/2014 | Angelo | |
| 8,745,256 B2 | 6/2014 | Hsiao | |
| 8,872,880 B1* | 10/2014 | Matselyukh | H04N 7/148 348/14.01 |
| 2002/0159394 A1 | 10/2002 | Decker et al. | |
| 2004/0047342 A1* | 3/2004 | Gavish | H04L 12/1813 370/352 |
| 2004/0054747 A1 | 3/2004 | Breh et al. | |
| 2005/0249196 A1* | 11/2005 | Ansari | H04L 12/2803 370/352 |
| 2007/0127668 A1 | 6/2007 | Ahya et al. | |
| 2007/0156813 A1 | 7/2007 | Galvez et al. | |
| 2007/0166007 A1 | 7/2007 | Hirai | |
| 2007/0177529 A1 | 8/2007 | Provino et al. | |
| 2008/0010482 A1 | 1/2008 | Tsang | |
| 2008/0120675 A1 | 5/2008 | Morad et al. | |
| 2009/0210789 A1 | 8/2009 | Thakkar et al. | |
| 2009/0238173 A1 | 9/2009 | Lin | |
| 2010/0005497 A1 | 1/2010 | Maresca | |
| 2010/0008419 A1 | 1/2010 | Wu et al. | |
| 2010/0180224 A1* | 7/2010 | Willard | G10H 1/0025 715/773 |
| 2010/0303061 A1* | 12/2010 | Wan | H04M 3/42365 370/352 |
| 2011/0279634 A1 | 11/2011 | Periyannan et al. | |
| 2012/0098921 A1* | 4/2012 | Stedman | H04M 3/567 348/14.08 |
| 2012/0196614 A1* | 8/2012 | Arora | H04L 51/36 455/456.1 |
| 2012/0297383 A1 | 11/2012 | Meisner et al. | |
| 2013/0031185 A1* | 1/2013 | Wyatt | G06Q 10/107 709/206 |
| 2013/0097244 A1* | 4/2013 | Manley | H04L 51/18 709/204 |
| 2013/0097333 A1* | 4/2013 | Bathurst | H04L 29/06027 709/231 |
| 2013/0201280 A1* | 8/2013 | Shen | H04N 7/147 348/14.12 |
| 2013/0321560 A1* | 12/2013 | Angelo, Sr. | H04N 7/152 348/14.03 |
| 2014/0082103 A1* | 3/2014 | Baxter, Jr. | H04L 51/36 709/206 |
| 2014/0118469 A1* | 5/2014 | Gwilt | H04M 7/0027 348/14.08 |
| 2014/0148934 A1* | 5/2014 | Manley | H04M 3/42 700/94 |
| 2014/0196137 A1* | 7/2014 | Schwebke | H04L 67/42 726/9 |
| 2014/0280595 A1* | 9/2014 | Mani | H04L 12/1827 709/204 |
| 2014/0280995 A1* | 9/2014 | Ezell | H04L 65/1016 709/229 |
| 2014/0359457 A1* | 12/2014 | Bellan | H04L 41/5054 715/736 |
| 2015/0077509 A1* | 3/2015 | Ben Natan | H04N 7/152 348/14.09 |
| 2015/0124863 A1 | 5/2015 | Ben Natan | |
| 2015/0135207 A1 | 5/2015 | Kitazato et al. | |
| 2016/0112469 A1* | 4/2016 | Liu | H04L 65/4046 348/14.03 |
| 2017/0054677 A1 | 2/2017 | Manley et al. | |

FOREIGN PATENT DOCUMENTS

| | | |
|---|---|---|
| EP | 1830568 A2 | 9/2007 |
| GB | 2349055 B | 3/2004 |
| WO | 94/24803 A1 | 10/1994 |

* cited by examiner

VIRTUAL MULTIPOINT CONTROL UNIT FOR UNIFIED COMMUNICATIONS

CROSS REFERENCE TO RELATED APPLICATIONS

This application claims priority and the benefits of the earlier filed Provisional U.S. A No. 61/859,358, filed 29 Jul. 2013, which is incorporated by reference for all purposes into this specification.

Additionally, this application is a continuation of U.S. application Ser. No. 14/341,818, filed 27 Jul. 2014, which is incorporated by reference for all purposes into this specification.

TECHNICAL FIELD

This disclosure relates to unified communication systems. More specifically, this disclosure invention relates to a system for a virtual multipoint control unit for unified communications.

BACKGROUND ART

Several Unified Communications (UC) software applications have proliferated into the enterprise communications market. These applications allow end-users to communicate using voice, video, application and data sharing, instant messaging, etc. A few examples of these applications include Microsoft Lync, Skype, IBM Sametime, Cisco IP Communicator, etc.

Most of these applications use different call control protocols and media formats (i.e. video/audio encoding and decoding formats), making them incompatible with each other. For example, Microsoft Lync uses a proprietary implementation of the Session Initiation Protocol (SIP) that is different from that being implemented by Skype for call negotiation. In addition, various UC applications typically operate with different media formats, thereby causing these applications to become incompatible with each other for communicating audio, video, or data streams. As a result, the communication among these applications is facilitated by a multipoint control unit, which may be implemented as standalone hardware or a web-based service via a central host performing call signaling and media transcoding. The standalone hardware is extremely costly whereas the web-based central host does not support ad-hoc communication among the UC applications running on terminals that are not connected to the same central host.

Further, the multipoint control unit typically allows multiple UC applications to access local hardware devices in a mutually exclusive manner. For example, video data streams from one UC application are temporarily restricted from being played on a local hardware device such as a display device while the device is in use by another UC application. As a result, the multipoint control unit induces an unwanted delay during execution of simultaneously received data streams from different UC applications Therefore, there exists a need for a system that allows multiple UC applications to access the local hardware devices simultaneously for ad-hoc unified communications.

SUMMARY OF INVENTION

This disclosure describes a virtual multipoint control unit on a host device in communication with one or more unified communication (UC) applications that allows ad hoc UC conferences between UC applications from the same or different vendors. The virtual multipoint control unit includes a host device coupled to a network, where the host device further comprises a processor, memory, and storage. In addition, the unit includes one or more unified communication (UC) applications being executed in software instructions in its native state under the target operating system on the host device, where the UC application further comprises a UC audio encoder/decoder that transmits and receives while providing encoding and decoding of the audio data stream. Further, the unit includes a UC virtual sound card in communication with the UC audio encoder/decoder. Additionally, the unit includes a virtual audio mixer in communication with the UC audio encoder/decoder. In addition, the unit includes a device driver module in communication with the virtual audio mixer, the device driver module in communication with one or more physical audio devices that further includes a speaker and/or a microphone. And where, the unit virtualizes the physical audio devices to be shared simultaneously between multiple said UC applications and allows ad hoc UC conferences between the UC applications from the same and or different UC vendors.

Further, the unit provides that the UC application further comprises a UC video encoder that transmits and encodes the outgoing encoded video data stream, and a UC video decoder that receives and decodes the incoming encoded video data stream wherein said UC video decoder is in communication with a UC display window and a UC virtual source.

And further, the unit includes a UC virtual camera in communication with the UC video encoder; a virtual video mixer in communication with the virtual source and the virtual camera; and a device driver module in communication with the virtual video mixer, with the device driver module in communication with one or more physical video devices that include a video camera and/or a video display; and where the virtual multipoint control unit virtualizes the physical video devices to be shared simultaneously between multiple the UC applications and allows ad hoc UC conferences between said UC applications from the same and or different UC vendors.

BRIEF DESCRIPTION OF DRAWINGS

To further aid in understanding the disclosure, the attached drawings help illustrate specific features of the disclosure and the following is a brief description of the attached drawings.

DISCLOSURE OF EMBODIMENTS

The present disclosure describes a virtual multipoint control unit for unified communications. The disclosed embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the included claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative hardware includes logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, any conventional processor, controller, microcontroller, or state machine. A general purpose processor may be considered a special purpose processor while the general purpose processor is configured to fetch and execute instructions (e.g., software code) stored on a computer readable medium such as any type of memory, storage, and/or storage devices. A processor may also be implemented as a combination of computing devices, such as a combination of a DSP and a microprocessor, a plurality of microprocessors, one or more microprocessors in conjunction with a DSP core, or any other such configuration.

In addition, the disclosed embodiments may be software or programs such as computer readable instructions that may be described in terms of a process that may be depicted as a flowchart, a flow diagram, a structure diagram, or a block diagram. The process may describe operational acts as a sequential process, many of these acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors.

Figure 3:
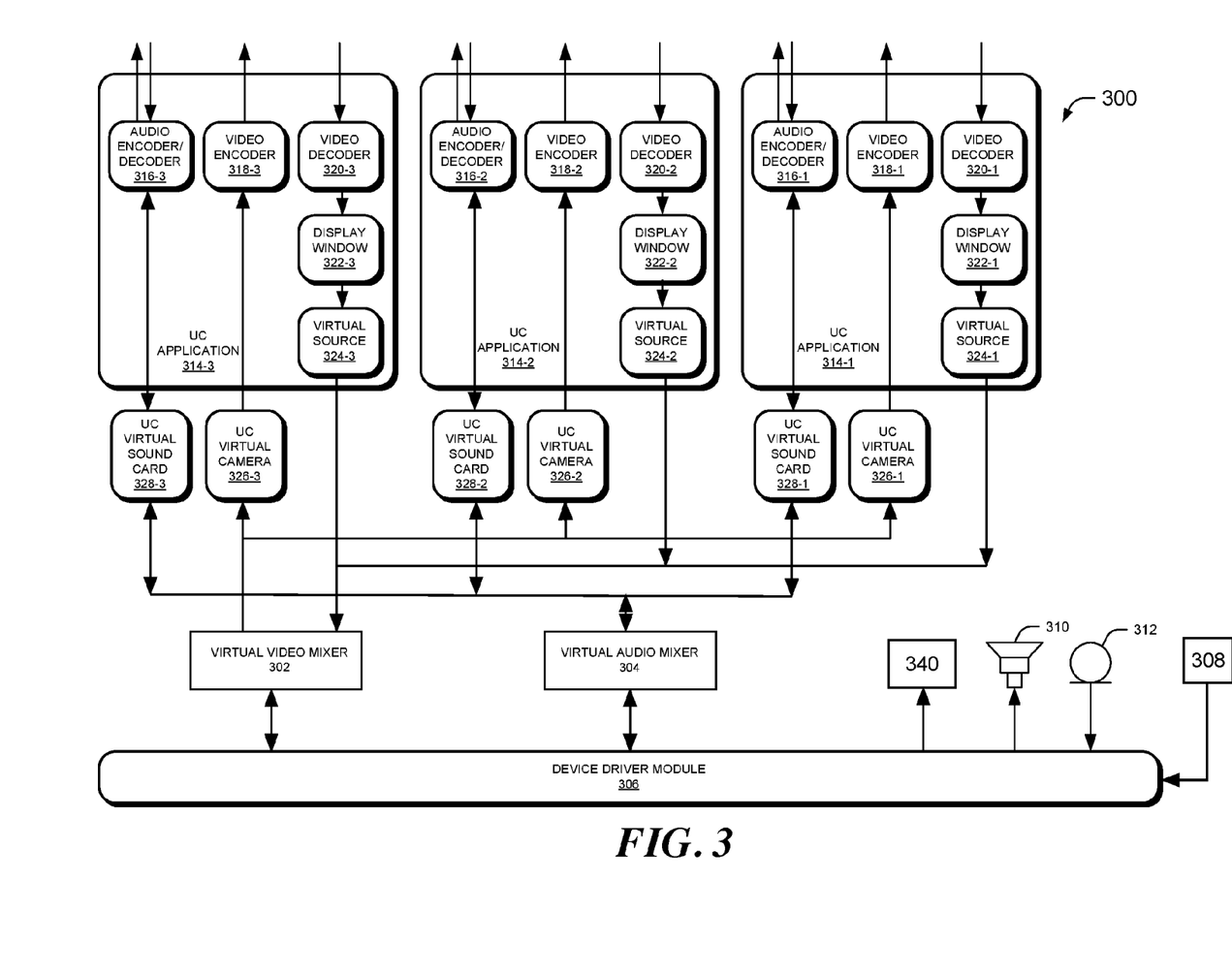
FIG. 3 is a schematic that illustrates a virtual multipoint control unit managing a multipoint video conference.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second element does not mean that only two elements may be employed or that the first element must precede the second element in some manner. In addition, unless stated otherwise, a set of elements may comprise one or more elements.

In various embodiments of the present disclosure, definitions of one or more terms that will be used in the document are provided below.

An endpoint refers to one or more computing devices capable of establishing a communication channel for exchange of audio, video, textual, or symbolic data in a communication session. Examples of the computing devices may include, but are not limited to, a desktop PC, a personal digital assistant (PDA), a server, a mainframe computer, a mobile computing device (e.g., mobile phones, laptops, tablets, etc.), an internet appliance, calling devices (e.g., a telephone, an internet phone, video telephone, etc.).

Real-time video and/or communication protocols include such protocols as session initiation protocol (SIP), H.261, H.263, H.264, H.323, Scalable video coding (SVC), or any other protocol known in the art, related art, or developed later.

The numerous references in the disclosure to a system for a virtual multipoint control unit are intended to cover any and/or all devices capable of performing respective operations on endpoints in a unified communication application-based conferencing environment relevant to the applicable context, regardless of whether or not the same are specifically provided.

Figure 1A:
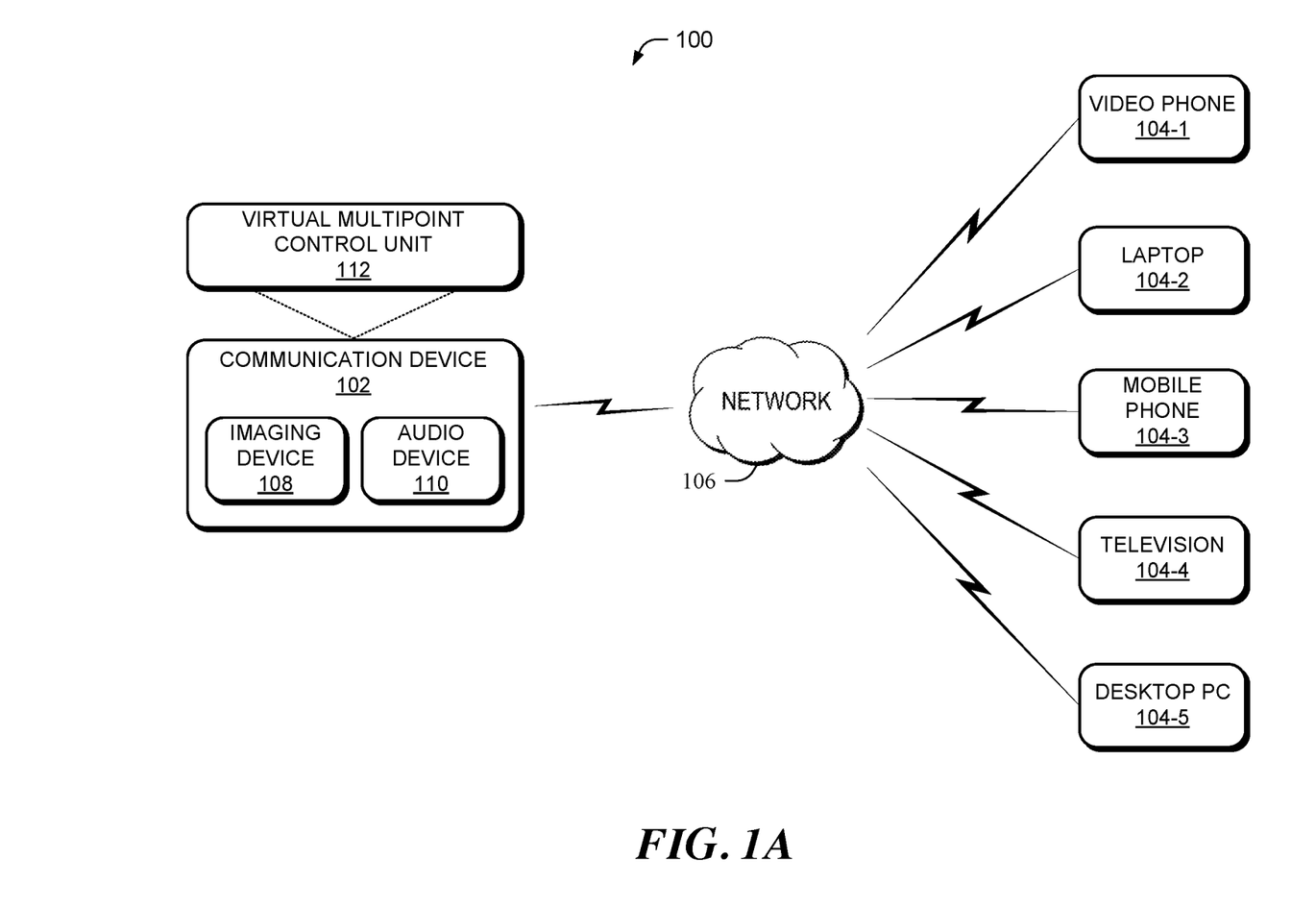
FIG. 1A is a schematic that illustrates a first embodiment for implementing the disclosed invention.

FIG. 1A is a schematic that illustrates a first environment for implementing an exemplary virtual multipoint control unit according to an embodiment of the present disclosure. Embodiments are disclosed in the context of environments that represent a multipoint video conference among multiple users via respective endpoints capable of executing one or more computer applications for unified communications in the same communication session. However, other embodiments may be applied in the context of other scenarios (e.g., an audio conference, a webinar, a multiplayer online game, etc.) involving one or more of audio, video, textual, or symbolic (e.g., emoticons, images, etc.) data being communicated among various endpoints in the same communication session. In some embodiments, one or more of the endpoints may execute a unified communication application (UC application) during the session.

The first network environment 100 may comprise multiple endpoints including a communication device 102 configured to communicate with terminals 104-1, 104-2, 104-3, 104-4, and 104-5 (collectively, terminals 104) via a network 106. The network 106 may comprise, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/ or any other delivery or tunneling mechanism for carrying data.

The network 106 may comprise multiple networks or sub-networks, each of which may comprise, for example, a wired or wireless data pathway. The network 106 may comprise a circuit-switched voice network, a packet-switched data network, or any other network that is able to carry electronic communications. For example, the network 106 may comprise networks based on the Internet protocol (IP) or asynchronous transfer mode (ATM), and may support voice using, for example, VoIP, Voice-over-ATM, or other comparable protocols used for voice data communications. In some embodiments, the network 106 may comprise a cellular telephone network configured to enable exchange of textual data, audio data, video data, or any combination thereof between the communication device 102 and one or more of the terminals 104.

The communication device 102 may comprise or be coupled with one or more hardware devices either wirelessly or in a wired fashion for enabling a user to dynamically interact with other users via the endpoints connected to the network 106. For example, the communication device 102 may be coupled with an imaging device 108 (including, but not limited to, a video camera, a webcam, a scanner, or any combination thereof) and an audio device 110 (including, but not limited to, a speaker, a microphone, or any combination thereof). The communication device 102 may be compatible with any other device (not shown) connected to the network 106 to exchange audio, video, textual or symbolic data streams with each other or any other compatible devices.

In one embodiment, the communication device 102 may comprise a virtual multipoint control unit 112 configured to do one or more of the following: (1) create a logical representation of one or more hardware devices in communication with the communication device 102; (2) establish a communication bridge or channel between the UC applications executed by the communication device 102, and the corresponding UC applications being executed by one or more of the terminals 104; (3) store, manage, and process the multimodal input data streams received from the endpoints and/or associated devices such as the imaging device 108 and the audio device 110 connected to the network 106; and (4) request services from or deliver services to, or both, various other devices connected to the network 106.

In one embodiment, the virtual multipoint control unit 112 may facilitate integration of real-time and non-real-time communication services by bridging communication among various UC applications being simultaneously executed on various endpoints, such as the communication device 102 and the terminals 104. Examples of such real-time services may include, but are not limited to, instant messaging, internet protocol (IP) telephony, video conferencing, desktop sharing, data sharing, call control, and speech recognition. Examples of these non-real-time services may include, but are not limited to, voicemail, E-mail, SMS, and fax. Further, examples of UC applications may include, but are not limited to, Microsoft Lync, Skype, IBM Sametime, and Cisco IP Communicator. Each of the UC applications may operate with same or different communication protocols and media formats.

In another embodiment, the virtual multipoint control unit 112 may be implemented as a standalone and dedicated "black box" including hardware and installed software, where the hardware is closely matched to the requirements and/or functionality of the software. Alternatively, the virtual multipoint control unit 112 may be implemented as a software application or a device driver. The virtual multipoint control unit 112 may enhance or increase the functionality and/or capacity of the network 106 to which it is connected. The virtual multipoint control unit 112 may be further configured, for example, to perform e-mail tasks, security tasks, network management tasks including IP address management, and other tasks.

In yet another embodiment, the virtual multipoint control unit 112 may be configured to expose its computing environment or operating code to the user, and may comprise related art I/O devices, such as camera, speaker, scanner, keyboard or display. The virtual multipoint control unit 112 may, however, comprise software, firmware or other resources that support remote administration and/or maintenance of the virtual multipoint control unit.

In a further embodiment, the virtual multipoint control unit 112 may comprise at one or more processors (not shown) executing machine readable program instructions for performing various operations, such as those discussed above, on the received multimodal input audio, video, textual, or symbolic data stream. The virtual multipoint control unit 112 may comprise, in whole or in part, a software application working alone or in conjunction with one or more hardware resources. Such software applications may be executed by the processor on different hardware platforms or emulated in a virtual environment, discussed below in greater detail. Aspects of the virtual multipoint control unit 112 may leverage known, related art, or later developed off-the-shelf software.

Figure 1B:
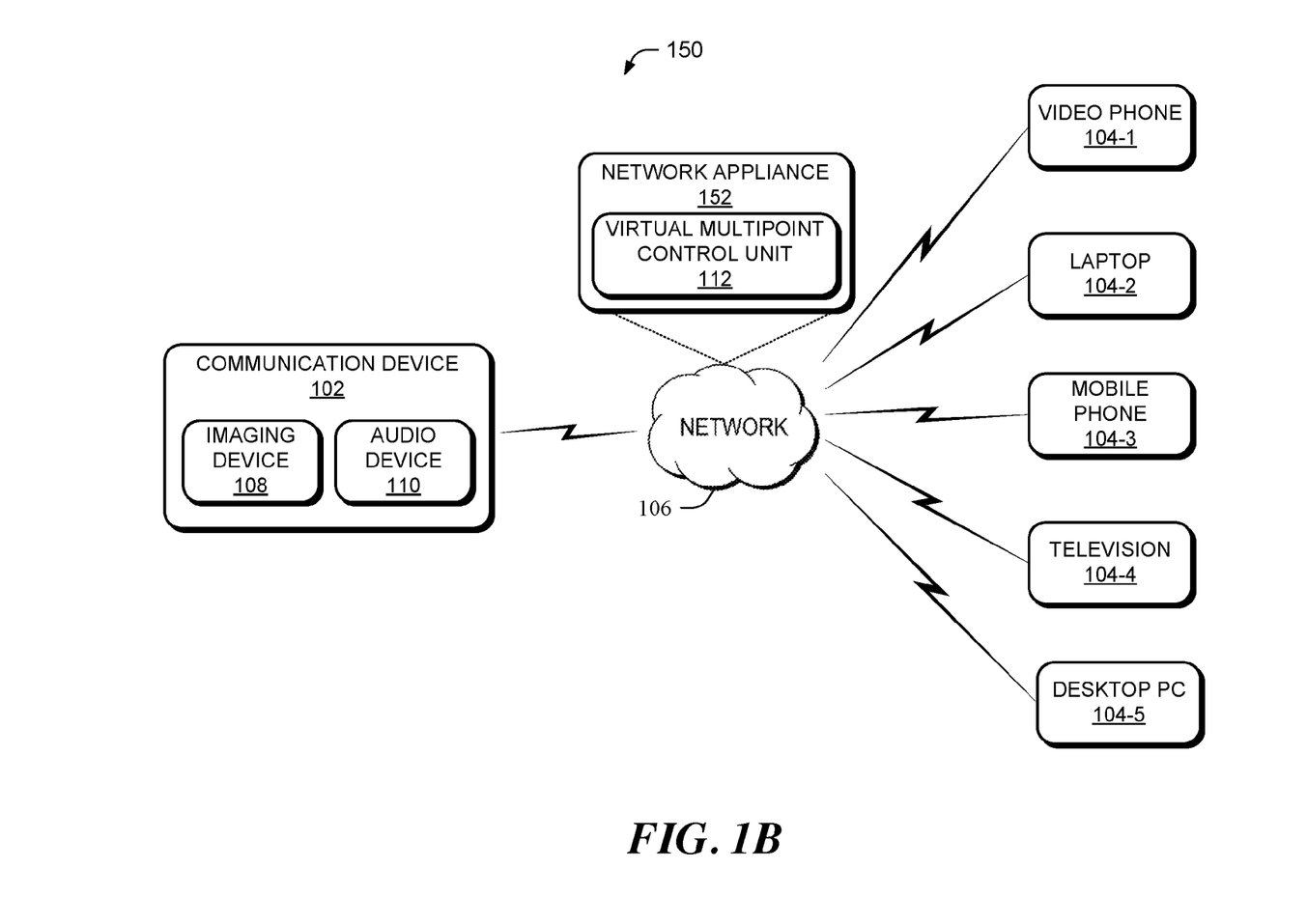
FIG. 1B is a schematic that illustrates a second embodiment for implementing the implementing the disclosed invention.

Now turning to FIG. 1B, a second network environment 150 is provided. In this embodiment, the virtual multipoint control unit 112 may be integrated with, or installed on, a network appliance 152 that is associated with or used to establish the network 106. The network appliance 152 may be capable of operating as an interface device to assist exchange of program instructions and data between the communication device 102 and the terminals 104. In some embodiments, the network appliance 152 may be preconfigured or dynamically configured to comprise the virtual multipoint control unit 112 integrated with other devices. For example, the virtual multipoint control unit 112 may be integrated with the communication device 102 or any other device, such as one or more of the terminals 104 connected to the network 106. The communication device 102 may comprise a module (not shown), which introduces the communication device 102 to the network appliance 152, thereby enabling the network appliance 152 to invoke the virtual multipoint control unit 112 as a service. Examples of the network appliance 152 may include, but are not limited to, a DSL modem, a wireless access point, a router, a base station, and a gateway having a predetermined computing power sufficient for implementing the virtual multipoint control unit 112.

The virtual multipoint control unit 112 and the communication device 102 may collectively constitute a unified communication system, which may reside in a single device or may be distributed across multiple devices. The unified communication system may be implemented in hardware or a suitable combination of hardware and software, and may comprise one or more software systems operating on a digital signal processing platform. Embodiments may comprise the unified communication system operating as or in a mobile switching center, network gateway system, Internet access node, application server, IMS core, service node, or some other communication system, including any combination thereof.

Similar to the communication device 102, each of the terminals 104 may be associated with various devices which may include, but are not limited to, a camera, display device, microphone, speakers, and one or more codecs, or any other type of conferencing hardware, or in any combination thereof. The terminals 104 may comprise video, voice and data communications capabilities (e.g., videoconferencing capabilities) by being coupled to or including, various audio devices (e.g., microphones, audio input devices, speakers, audio output devices, telephones, speaker telephones, etc.), various video devices (e.g., monitors, projectors, displays, televisions, video output devices, video input devices, cameras, etc.), various networks (IP, PSTN, etc.) or any combination thereof. Each of the terminals 104 may comprise or implement one or more real time video and/or communication protocols.

Figure 2A:
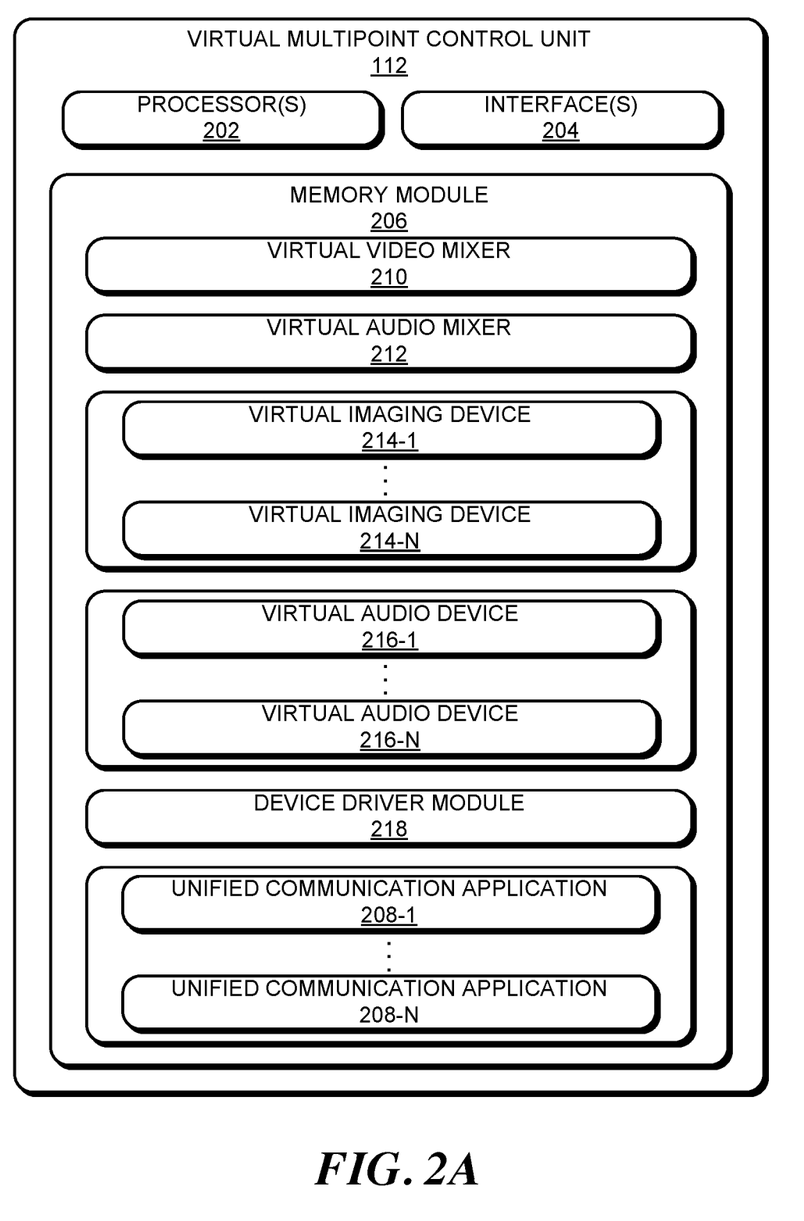
FIG. 2A is a schematic that illustrates the disclosed invention.

FIG. 2A illustrates an exemplary virtual multipoint control unit according to an embodiment of the present disclosure. The virtual multipoint control unit 112 may comprise one or more processor(s) 202, one or more interface(s) 204, and a memory module 206 that functions as both memory and a storage device.

The interface(s) 204 may coordinate interactions of the virtual multipoint control unit 112 with one or more of the terminals 104 from communication device 102 over the network 106. The interface(s) 204 may comprise a variety of known, related art, or later developed interfaces, such as (1) software interfaces, for example, an application programming interface, a graphical user interface, etc.; (2) hardware interfaces, for example, cable connectors, keyboards, touchscreen, scanners, display screens, etc.; or both. The interface (s) 204 facilitate receiving of the audio, video, or data signals, and reliable broadcast or multicast transmissions of one or more encoded output signals.

The memory module 206 may comprise any computer-readable medium known in the art, comprising, for example, volatile memory (e.g., RAM) and/or non-volatile memory (e.g., flash, etc.). The memory module 206 may store UC applications 208-1, . . . , 208-N (collectively referred to as UC applications 208), a virtual video mixer 210, a virtual audio mixer 212, virtual imaging devices 214-1, . . . 214-N (collectively, virtual imaging devices 214), virtual audio devices 216-1, . . . , 216-N (collectively, virtual audio devices 216), and a device driver module 218.

The virtual multipoint control unit 112 may be configured to implement various real-time and non-real time communication protocols for rendering and transmitting various audio, video, textual, or symbolic communication signals from the UC applications 208. In some embodiments, the virtual multipoint control unit 112 may be configured to determine various characteristics of the endpoints such as the communication device 102 and the terminals 104 for handling the respective received signals. The characteristics may include, but are not limited to, type of endpoint (e.g., a mobile phone, a laptop, an IP television, etc.), supported video resolution, supported codecs, network connection speed, and so on.

The virtual video mixer 210 may be configured to receive a decoded video stream from each of the UC applications 208 or a physical local imaging device such as the imaging device 108, which is associated with the communication device 102. The virtual video mixer 210 may be further configured to switch between various video streams received from different UC applications 208 to either continuously display a received video stream while operating in a continuous presence mode, or tile a video stream received from each of the UC applications 208 from which a respective audio stream is actively received while operating in a voice-switched mode.

The virtual audio mixer 212 may be configured to receive an input audio stream either from a physical local audio device such as the audio device 110 (e.g., a microphone) or a virtual audio device 216 (e.g., a virtual sound card) in communication with each of the UC applications 208. The virtual audio mixer may use the received audio streams to create a mixed and re-encoded audio stream for being played or transmitted to one or more UC applications 208 simultaneously. The re-encoded audio stream excludes the input audio stream received from its corresponding virtual source, discussed below in greater detail.

The virtual imaging devices 214 and the virtual audio devices 216 may be logical representations of an imaging device (e.g., a camera) and an audio device (e.g., a speaker, a microphone, etc.) with no physical counterparts. The virtual imaging device 214 may be an image derived from the virtual video mixer 210. The virtual imaging device 214 may provide either a tiled image of active participants, or an image of the active speaker, received from the respective UC applications, depending on whether the virtual video mixer 210 is operating in voice-switched or mixer (i.e., continuous presence) mode.

The virtual audio devices 216 may be virtual representations of an audio device, which may be emulated by each of the UC applications 208. Similar to the virtual imaging device 214, the virtual audio device 216 has no physical counterpart and derives its input audio stream from the virtual audio mixer 212 as well as outputs audio streams to the virtual audio mixer 212. Each of the virtual imaging devices 214 and the virtual audio devices 216 may be created for each of the UC applications 208 for independently supporting the audio and video data streams being received from or sent to the endpoints or any other unified communication system simultaneously.

The device driver module 218 may comprise device drivers, which are software programs that introduce hardware devices such as endpoints (e.g., the communication device 102 and the terminals 104) and associated devices (e.g., the imaging device 108 and the audio device 110) to the virtual multipoint control unit 112. The device drivers handle software instructions received from the UC applications 208 for accessing the hardware devices and associated resources (e.g., attached peripheral devices, hardware memory, etc.) without causing conflicts.

Figure 2B:
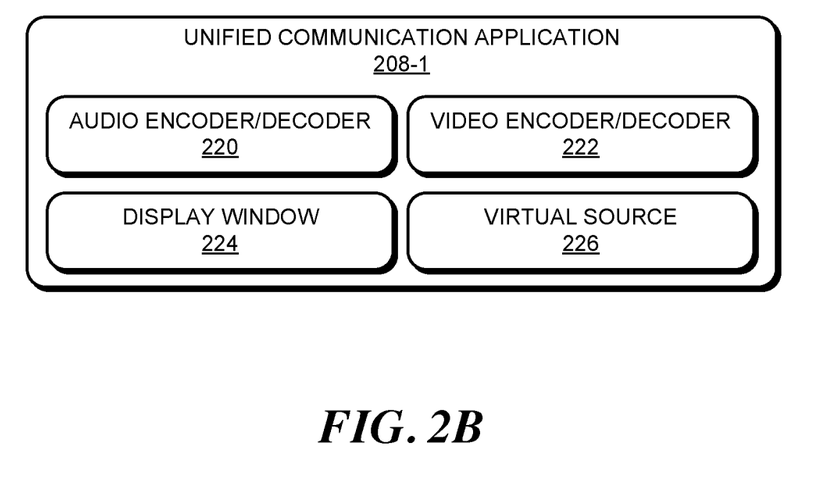
FIG. 2B is a schematic that illustrates the disclosed invention.

Further, as shown in FIG. 2B, one or more of the UC applications such as the UC application 208-1 may comprise an audio encoder/decoder 220, a video encoder/decoder 222, a display window 224, and a virtual source 226. The audio encoder/decoder 220 may be configured to decode and encode audio streams received from or sent to the virtual audio mixer 212 respectively using known, related art, or later developed encoding/decoding protocols and standards. Similarly, the video encoder/decoder 222 may be configured to decode and encode the video streams received from or sent to the virtual video mixer 210 respectively using known, related art, or later developed encoding/decoding protocols and standards. The display window 224 refers to an output software interface configured to display the video streams/signals. The virtual source 226 may be configured to provide decoded video data stream to the virtual video mixer 210 via the display window 224.

FIG. 3 illustrates a virtual multipoint control unit 300 managing a multipoint video conference according to an embodiment of the present disclosure. The virtual multipoint control unit 300 may comprise a virtual video mixer 302, a virtual audio mixer 304, and a device driver module 306. In one embodiment, the virtual video mixer 302 and the virtual audio mixer 304 is in communication with the device driver module 306. The device driver module 306 comprises device drivers for operating or managing the respective physical hardware devices that may be attached such as the camera 308, the display device 340 (such as a monitor or HDTV), the local speaker 310, and the microphone 312. The device driver module 306 allows the virtual video mixer 302 and virtual audio mixer 304 to be in communication with the local imaging devices local audio devices.

The virtual multipoint control unit 300 may further comprise various videoconferencing software applications such as UC applications 314-1, 314-2, and 314-3 (collectively, UC applications 314) for conducting a video conference among multiple endpoints, e.g., the communication device 102 and the terminals 104 (from FIGS. 1A and 1B) in an ad hoc manner. The first UC application 314-1 comprises a first audio encoder/decoder 316-1, a first video encoder 318-1, a first video decoder 320-1, a first display window 322-1, and a first virtual source 324-1. Similarly, the second UC application 314-2 comprises a second audio encoder/decoder 316-2, a second video encoder 318-2, a second video decoder 320-2, a second display window 322-2, and a second virtual source 324-2. The third UC application 314-3 comprises a third audio encoder/decoder 316-3, a third video encoder 318-3, a third video decoder 320-3, a third display window 322-3, and a third virtual source 324-3.

The display windows 322-1, 322-2, 322-3 (collectively, display windows 322) may be configured to receive the decoded video streams from the respective video decoders 320-1, 320-2, 320-3 (collectively, video decoders 320) for displaying the video streams on the local display device 340.

The virtual sources 324-1, 324-2, 324-3 (collectively, virtual sources 324) may be configured to receive the decoded video data streams via the respective display windows 322 for being sent to the virtual video mixer 302, which combines the received video streams and renders a single video stream (e.g., to display images from each of the video streams in a tiled format) to reduce the required network bandwidth for display or recording.

Each of the UC applications 314 may communicate with a respective set of UC virtual devices to allow the UC applications 314 to access the physical hardware devices, which are in communication with the virtual multipoint control unit 300 simultaneously. For example, the UC application 314-1 may communicate with a first set of UC virtual devices including a first UC virtual camera 326-1 and a first UC virtual sound card 328-1, and the UC application 314-2 may communicate with a second set of UC virtual devices including a second UC virtual camera 326-2 and a second UC virtual sound card 328-2. Similarly, the UC application 314-3 may communicate with a third set of UC virtual devices including a third UC virtual camera 326-3 and a third UC virtual sound card 328-3.

Further, each set of the UC virtual devices may emulate a physical device by defining a software configuration and a related hardware configuration, both being compatible with the respective UC applications. Correspondingly, each of the UC virtual cameras 326-1, 326-2, 326-3 (collectively, UC virtual cameras 326) may be a logical representation or an image of an imaging device (e.g., a camera) without being mapped or corresponding to a physical camera. Similarly, each of the UC virtual sound cards 328-1, 328-2, 328-3 (collectively, UC virtual sound cards 328) may refer to a logical representation or an image of an audio device (e.g., a speaker or a microphone) without being mapped or corresponding to a physical audio device. The UC virtual cameras 326 may be derived from the virtual video mixer 302 and the UC virtual sound cards 328 may be derived from the virtual audio mixer 304 by the respective UC applications 314.

During a video conference, multiple endpoints such as the communication device 102 and the terminals 104 (from FIGS. 1A and 1B) may execute various videoconferencing software applications similar to the UC applications 314 in the virtual multipoint control unit 300. Each of these videoconferencing software applications may interact in an ad hoc manner with the corresponding UC applications 314 in the virtual multipoint control unit 300 during a single communication session to conduct the video conference, since the videoconferencing software applications may not be compatible with each other due to different control protocols and media formats being used. The virtual multipoint control unit 300 may operate in four distinct modes, namely, inbound audio mode, inbound video mode, outbound audio mode, and outbound video mode, to handle any audio, video, or data streams to and from these UC applications 314, while simultaneously providing one or more local hardware devices to each of the participating UC applications 314.

In the inbound audio mode, the endpoints such as the communication device 102 and the terminals 104 may capture a local audio data stream and provide encoded audio streams via UC applications 314 (e.g., Microsoft Lync, Skype, Cisco IP communicator, etc.) executing on each of these endpoints. The provided encoded audio streams may be received by the audio encoder/decoders 316-1, 316-2, 316-3 (collectively, audio encoders/decoders 316) of the same UC applications 314 running in the virtual multipoint control unit 300. The received audio streams may be encoded in any of the known, related art, or later developed real-time audio protocols such as RTP (real-time transport protocol). The audio encoder/decoders 316 may be configured to decode the received audio streams and send the decoded audio streams to the respective UC virtual sound cards 328, which may route the decoded audio streams to the virtual audio mixer 304 via the virtual video mixer 302. The UC virtual sound cards 328 facilitate to provide the decoded audio streams to the virtual audio mixer 304 from multiple UC applications 314 simultaneously.

The decoded audio streams may facilitate the operation of the virtual video mixer 302 being configured to operate in the voice-switched mode. The received audio streams may be summed at the virtual audio mixer 304 may be configured to perform a summation of the received audio streams to generate a single audio stream so as to minimize audio interferences or background noise as known in the art. The generated audio stream may be sent to one or more physical audio devices such the local speaker 310. When the generated audio stream is played by the local speaker 310, the virtual audio mixer 304 may send a notification to the virtual video mixer 302 to allow synchronization between the audio and the video streams. In some embodiments, the virtual video mixer 302 may add delay to a received video stream to synchronize it with the audio stream.

In the outbound audio mode, the local microphone 312 may capture the audio data stream of the local participants and send the captured audio data stream to the virtual audio mixer 304. The virtual audio mixer 304 may send the captured audio stream to the audio encoder/decoders, such as the audio encoder/decoder 316-1, via the respective UC virtual sound card 328-1 of a selected UC application, such as the UC application 314-1, among the available UC applications 314. Such selection of the UC application may be performed on-the-fly by a user or may be preprogrammed. The audio encoder/decoder 316-1 may encode the received audio data stream using a predetermined real-time protocol known in the art, related art or later developed, and transmit the encoded audio data stream to a predetermined endpoint such as the communication device 102 or the terminals 104. The audio streams may be encoded using any of the known, related art, or later developed real-time audio protocols such as RTP (real-time transport protocol). The audio encoder/decoders 316-2 and 316-3 may also operate in a similar manner.

In the inbound video mode, the endpoints such as the communication device 102 and the terminals 104 may capture video data stream of participants local to the endpoints and provide encoded video streams via the videoconferencing software applications being executed on each of these endpoints. The provided encoded audio streams may be received by the video decoders 320-1, 320-2, 320-3 (collectively, video decoders 320) of the respective UC applications 314, which were used at the endpoints to send the video streams to the virtual multipoint control unit 300. The received video streams may be encoded in for use in a real-time video and/or communication protocol. The video decoders 320 may be configured to decode the received video streams and send the decoded video streams to the respective UC virtual cameras 326-1, 326-2, 326-3 (collectively, UC virtual cameras 326), which may route the decoded video streams to the virtual video mixer 302.

The UC virtual cameras 326 facilitate to provide the decoded video streams for use from multiple UC applications 314 simultaneously. The virtual video mixer 302 may perform a summation of the received video streams to generate a single video stream for one or more of (1) minimizing video interferences or background noise; and (2) represent the video images from different decoded video streams as tiles for display. The decoded video streams may be displayed on a display device 340 on the basis of the virtual video mixer 302 being preset to operate in continuous presence mode or the voice-switched mode.

In the outbound video mode, the local camera 308 may capture the video data stream of the local participants and send the captured video data stream to the virtual video mixer 302. The virtual video mixer 302 sends the captured video stream to a video encoder such as the video encoder 318-1 via the UC virtual camera 326-1 of a selected UC application, such as the UC application 314-1, among the available UC applications 314. Such selection of the UC application 314-1 may be performed on-the-fly by a user or may be preprogrammed. The video encoders 320 may encode the received video data stream using a predetermined real-time protocol known in the art, related art or later developed and transmit the encoded video data stream to a predetermined endpoint such as the communication device 102 or the terminals 104. The video streams may be encoded using a real-time video and/or communication protocol.

Figure 4:
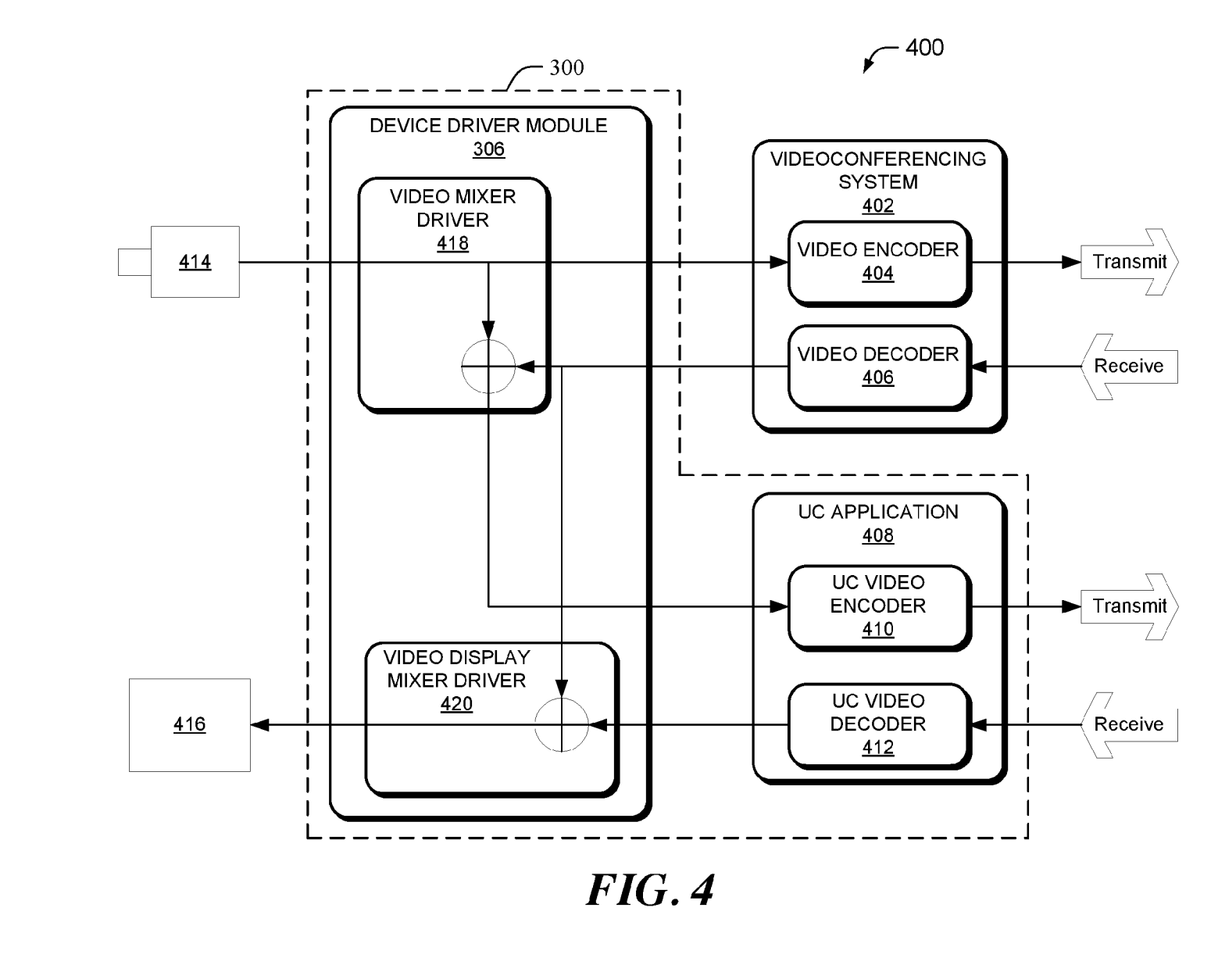
FIG. 4 is a schematic illustrating implementation of a device driver module of the virtual multipoint control unit for communicating with hardware devices for conducting a video conference.

FIG. 4 is a schematic implementation of a device driver module of the virtual multipoint control unit for communicating with hardware devices according to an embodiment of the present disclosure. Illustrated embodiments are disclosed in the context of a video conference environment 400 including (1) a videoconferencing system 402 (e.g., CLEARONE Collaborate Room) comprising a video encoder 404 and a video decoder 406; (2) a UC application 408 comprising a UC video encoder 410 and a UC decoder 412, (3) a physical camera 414, (4) a display device 416, and (5) the device driver module 306 of the virtual multipoint control unit 300. The device driver module 306 (from FIG. 3) comprises a video mixer driver 418 and a video display mixer driver 420. The physical camera 414 may be in communication with the video conferencing system 402 and the UC application 408 via the video display mixer driver 418. The display device 416 may be in communication with the videoconferencing system 402 and the UC application 408 via the video display mixer driver 420.

The operation of the virtual multipoint control unit 300 may be described in four different modes. In the first mode, the physical camera 414 may capture a local image of the participants and provide a video stream for transmission. The video mixer driver 418 may be configured to transmit the captured video stream to a physical hardware such as the video conferencing system 402 or to the UC application 408 based on a transmission mode selected by a user. When the transmission mode indicates for a hardware to be used for transmission, the video mixer driver 418 guides the captured video stream to the video encoder 404, which may encode the video stream using any of the known in the art, related art, or later developed encoding algorithms for real-time network transmission using a predetermined real-time video and/or communication protocol. When the transmission mode indicates for the UC application 408 to be used for transmission, the video mixer driver 418 guides the captured video stream to the UC video encoder 410, which may encode the video stream using the real-time video and/or communication protocol. In some embodiments, the captured video stream may be simultaneously sent to the video encoder 404 and the UC video encoder 410 for encoding and network transmission.

Similarly, the video display mixer driver 420 may be configured to manage an encoded video stream received from a network such as the network 106 via the videoconferencing system 402. The received video stream may be encoded using a real-time video and/or communication protocol. The video decoder 406 may receive and decode the encoded video stream to generate a decoded video stream, which may be sent to the video mixer driver 418. The video mixer driver 418 may be configured to guide the decoded video stream to the video display mixer driver 420, which may transmit the decoded video stream to the display device 416 for display. Alternatively, the encoded video stream may be received by the UC video decoder 412, which may be configured to decode the encoded video stream and send a generated decoded video stream to the display device 416 via the video display mixer driver 420 for display.

While the present disclosure has been described herein with respect to certain illustrated and described embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with

We claim the following invention:

1. A virtual multipoint control unit on a host device in communication with one or more unified communication (UC) applications that allows ad hoc UC conferences between UC applications from the same or different vendors, comprising:
   a host device coupled to a network, said host device further comprises a processor, memory, and storage;
   one or more unified communication (UC) applications being executed in software instructions in its native state under the target operating system on said host device, said UC application further comprises a UC audio encoder/decoder that transmits and receives while providing encoding and decoding of the audio data stream;
   a UC virtual sound card in communication with said UC audio encoder/decoder;
   a virtual audio mixer in communication with said UC audio encoder/decoder;
   a device driver module in communication with said virtual audio mixer, said device driver module in communication with one or more physical audio devices that further includes a speaker and/or a microphone; and
   wherein the virtual multipoint control unit virtualizes said physical audio devices to be shared simultaneously between multiple said UC applications and allows ad hoc UC conferences between said UC applications from the same and or different UC vendors.

2. The claim according to claim 1 wherein said UC application further comprises a UC video encoder that transmits and encodes the outgoing encoded video data stream, and a UC video decoder that receives and decodes the incoming encoded video data stream wherein said UC video decoder is in communication with a UC display window and a UC virtual source.

3. The claim according to claim 2 further comprising:
   a UC virtual camera in communication with said UC video encoder;
   a virtual video mixer in communication with said virtual source and said virtual camera;
   a device driver module in communication with said virtual video mixer, said device driver module in communication with one or more physical video devices that include a video camera and/or a video display; and
   wherein the virtual multipoint control unit virtualizes said physical video devices to be shared simultaneously between multiple said UC applications and allows ad hoc UC conferences between said UC applications from the same and or different UC vendors.

4. The claim of claim 1 wherein the virtual multipoint control unit operates in one or more modes that further comprises an inbound audio mode, or an outbound audio mode to handle any audio data streams to and from said UC applications while simultaneously providing one or more said physical audio devices to each of the participating said UC applications.

5. The claim of claim 3 wherein the virtual multipoint control unit operates in one or more modes that further comprise an inbound audio mode, an inbound video mode, an outbound audio mode, and an outbound video mode, to handle any audio, video, or data streams to and from said UC applications while simultaneously providing one or more said physical audio devices and said physical video devices to each of the participating said UC applications.

6. A method for manufacturing a virtual multipoint control unit on a host device in communication with one or more unified communication (UC) applications that allows ad hoc UC conferences between UC applications from same or different vendors, comprising:
   providing a host device coupled to a network, said host device further comprises a processor, memory, and storage;
   providing one or more unified communication (UC) applications being executed in software instructions in its native state under the target operating system on said host device, said UC application further comprises a UC audio encoder/decoder that transmits and receives while providing encoding and decoding of the audio data stream;
   providing a UC virtual sound card in communication with said UC audio encoder/decoder;
   providing a virtual audio mixer in communication with said UC audio encoder/decoder;
   providing a device driver module in communication with said virtual audio mixer, said device driver module in communication with one or more physical audio devices that further includes a speaker and/or a microphone; and
   wherein the virtual multipoint control unit virtualizes said physical audio devices to be shared simultaneously between multiple said UC applications and allows ad hoc UC conferences between said UC applications from the same and or different UC vendors.

7. The claim according to claim 6 wherein said UC application further comprises a UC video encoder that transmits and encodes the outgoing encoded video data stream, and a UC video decoder that receives and decodes the incoming encoded video data stream wherein said UC video decoder is in communication with a UC display window and a UC virtual source.

8. The claim according to claim 7 further comprising:
   providing a UC virtual camera in communication with said UC video encoder;
   providing a virtual video mixer in communication with said virtual source and said virtual camera;
   providing a device driver module in communication with said virtual video mixer, said device driver module in communication with one or more physical video devices that include a video camera and/or a video display; and
   wherein the virtual multipoint control unit virtualizes said physical video devices to be shared simultaneously between multiple said UC applications and allows ad hoc UC conferences between said UC applications from the same and or different UC vendors.

9. The claim of claim 6 wherein the virtual multipoint control unit operates in one or more modes that further comprises an inbound audio mode, or an outbound audio mode to handle any audio data streams to and from said UC applications while simultaneously providing one or more said physical audio devices to each of the participating said UC applications.

10. The claim of claim 8 wherein the virtual multipoint control unit operates in one or more modes that further comprise an inbound audio mode, an inbound video mode, an outbound audio mode, and an outbound video mode, to handle any audio, video, or data streams to and from said UC applications while simultaneously providing one or more said physical audio devices and said physical video devices to each of the participating said UC applications.

11. A method to use a virtual multipoint control unit on a host device in communication with one or more unified communication (UC) applications that allows ad hoc UC conferences between UC applications from the same or different vendors, comprising:
   providing a host device coupled to a network, said host device further comprises a processor, memory, and storage;
   providing one or more unified communication (UC) applications being executed in software instructions in its native state under the target operating system on said host device, said UC application further comprises a UC audio encoder/decoder that transmits and receives while providing encoding and decoding of the audio data stream;
   communicating between a UC virtual sound card and said UC audio encoder/decoder;
   communicating between a virtual audio mixer with said UC audio encoder/decoder;
   communicating between a device driver module with said virtual audio mixer, communicating between said device driver module and one or more physical audio devices that further includes a speaker and/or a microphone; and
   wherein the virtual multipoint control unit virtualizes said physical audio devices to be shared simultaneously between multiple said UC applications and allows ad hoc UC conferences between said UC applications from the same and or different UC vendors.

12. The claim according to claim 11 wherein said UC application further comprises a UC video encoder that transmits and encodes the outgoing encoded video data stream, and a UC video decoder that receives and decodes the incoming encoded video data stream wherein said UC video decoder is in communication with a UC display window and a UC virtual source.

13. The claim according to claim 12 further comprising:
   communicating between a UC virtual camera and said UC video encoder;
   communicating between a virtual video mixer and said virtual source and said virtual camera;
   communicating between a device driver module and said virtual video mixer, communicating between said device driver module and one or more physical video devices that include a video camera and/or a video display; and
   wherein the virtual multipoint control unit virtualizes said physical video devices to be shared simultaneously between multiple said UC applications and allows ad hoc UC conferences between said UC applications from the same and or different UC vendors.

14. The claim of claim 11 wherein the virtual multipoint control unit operates in one or more modes that further comprises an inbound audio mode, or an outbound audio mode to handle any audio data streams to and from said UC applications while simultaneously providing one or more said physical audio devices to each of the participating said UC applications.

15. The claim of claim 13 wherein the virtual multipoint control unit operates in one or more modes that further comprise an inbound audio mode, an inbound video mode, an outbound audio mode, and an outbound video mode, to handle any audio, video, or data streams to and from said UC applications while simultaneously providing one or more said physical audio devices and said physical video devices to each of the participating said UC applications.

16. A non-transitory computer readable medium storing a program of instructions executable by a computing device to perform a method for using a virtual multipoint control unit on a host device in communication with one or more unified communication (UC) applications that allows ad hoc UC conferences between UC applications from the same or different vendors, comprising:
   providing a host device coupled to a network, said host device further comprises a processor, memory, and storage;
   providing one or more unified communication (UC) applications being executed in software instructions in its native state under the target operating system on said host device, said UC application further comprises a UC audio encoder/decoder that transmits and receives while providing encoding and decoding of the audio data stream;
   communicating between a UC virtual sound card and said UC audio encoder/decoder;
   communicating between a virtual audio mixer with said UC audio encoder/decoder;
   communicating between a device driver module with said virtual audio mixer, communicating between said device driver module and one or more physical audio devices that further includes a speaker and/or a microphone; and
   wherein the virtual multipoint control unit virtualizes said physical audio devices to be shared simultaneously between multiple said UC applications and allows ad hoc UC conferences between said UC applications from the same and or different UC vendors.

17. The claim according to claim 16 wherein said UC application further comprises a UC video encoder that transmits and encodes the outgoing encoded video data stream, and a UC video decoder that receives and decodes the incoming encoded video data stream wherein said UC video decoder is in communication with a UC display window and a UC virtual source.

18. The claim according to claim 11 further comprising:
   communicating between a UC virtual camera and said UC video encoder;
   communicating between a virtual video mixer and said virtual source and said virtual camera;
   communicating between a device driver module and said virtual video mixer, communicating between said device driver module and one or more physical video devices that include a video camera and/or a video display; and
   wherein the virtual multipoint control unit virtualizes said physical video devices to be shared simultaneously between multiple said UC applications and allows ad hoc UC conferences between said UC applications from the same and or different UC vendors.

19. The claim of claim 16 wherein the virtual multipoint control unit operates in one or more modes that further comprises an inbound audio mode, or an outbound audio mode to handle any audio data streams to and from said UC applications while simultaneously providing one or more said physical audio devices to each of the participating said UC applications.

20. The claim of claim 18 wherein the virtual multipoint control unit operates in one or more modes that further comprise an inbound audio mode, an inbound video mode, an outbound audio mode, and an outbound video mode, to handle any audio, video, or data streams to and from said UC applications while simultaneously providing one or more said physical audio devices and said physical video devices to each of the participating said UC applications.

* * * * *

UNITED STATES PATENT AND TRADEMARK OFFICE
CERTIFICATE OF CORRECTION

PATENT NO.       : 9,781,386 B2
APPLICATION NO.  : 15/062066
DATED            : October 3, 2017
INVENTOR(S)      : Avishay Ben Natan It is certified that error appears in the above-identified patent and that said Letters Patent is hereby corrected as shown below:

On the Title Page

In item (57), in Column 2, in "Abstract", Line 12, delete "and or" and insert -- and/or --, therefor.

In the Specification

In Column 1, Line 8, delete "U.S. A" and insert -- U.S.A --, therefor.

In Column 1, Line 58, after "applications" insert -- . --.

In Column 2, Line 21, delete "and or" and insert -- and/or --, therefor.

In Column 2, Line 39, delete "and or" and insert -- and/or --, therefor.

In the Claims

In Column 13, Line 34, in Claim 1, delete "and or" and insert -- and/or --, therefor.

In Column 13, Line 55, in Claim 3, delete "and or" and insert -- and/or --, therefor.

In Column 14, Line 32, in Claim 6, delete "and or" and insert -- and/or --, therefor.

In Column 14, Line 54, in Claim 8, delete "and or" and insert -- and/or --, therefor.

In Column 15, Line 32, in Claim 11, delete "and or" and insert -- and/or --, therefor.

In Column 15, Line 54, in Claim 13, delete "and or" and insert -- and/or --, therefor.

In Column 16, Line 33, in Claim 16, delete "and or" and insert -- and/or --, therefor.

Signed and Sealed this
Fifth Day of December, 2017

Joseph Matal
*Performing the Functions and Duties of the
Under Secretary of Commerce for Intellectual Property and
Director of the United States Patent and Trademark Office*

In Column 16, Line 41, in Claim 18, delete "claim 11" and insert -- claim 17 --, therefor.

In Column 16, Line 55, in Claim 18, delete "and or" and insert -- and/or --, therefor.